United States Patent Office 3,297,696
Patented Jan. 10, 1967

3,297,696
6 - AMINO - 8,9 - DIHYDRO-13bH-ISOQUINOLO-
[2,1-c] QUINAZOLINES AND INTERMEDIATES
THEREFOR
Hans Ott, Convent Station, N.J., assignor to Sandoz Inc.,
Hanover, N.J.
No Drawing. Filed May 28, 1965, Ser. No. 459,920
32 Claims. (Cl. 260—247.5)

The present invention is directed to pharmaceutically acceptable 6-amino-8,9-dihydro-13bH-isoquinolo[2,1-c] quinazolines in general, and particularly those of the formula

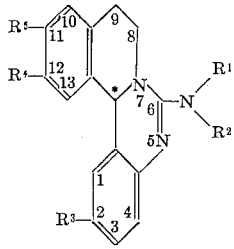

wherein $R^1$ is either a hydrogen atom (—H); lower alkyl, e.g. methyl, ethyl, propyl, isopropyl and butyl; lower cycloalkyl, e.g. cyclopropyl, cyclobutyl, cyclopentyl, cyclohexyl and cycloheptyl; lower hydroxyalkyl, e.g. β-hydroxyethyl, γ-hydroxypropyl and β-hydroxypropyl; lower alkoxy lower alkyl, e.g. β-methoxyethyl and γ-ethoxypropyl; lower alkylamino lower alkyl, the alkylene bridge having from 2 to 6 carbon atoms, e.g. β-ethylaminoethyl and γ-methylaminopropyl; lower dialkylamino lower alkyl, e.g. dimethylaminoethyl and diethylaminopropyl; phenyl(lower) alkyl, e.g. benzyl and phenethyl; and —$(CH_2)_{n-1}$—Z, e.g. pyrrolidylethyl, piperidylpropyl, morpholinoethyl and 4-methylpiperazinylethyl;

Z is a heterocyclic radical containing from 5 to 6 ring members at least one of which is a nitrogen atom and at most one additional of which is also a hetero atom, i.e. oxygen, nitrogen or sulfur, the bridge —$(CH_2)_{n-1}$— being directly bonded to either a ring carbon atom or a ring nitrogen atom of the heterocyclic radical when $n$ is either 3 or 4, and the nitrogen atom of —$N(R^1)R^2$ being bonded directly to a carbon atom (either in said bridge or a ring member on said heterocyclic radical); and $n$ is a positive whole number of at most 4;

$R^2$ is either a hydrogen atom (—H) or lower alkyl, e.g. methyl, ethyl, propyl, isopropyl and butyl;

is, alternatively, either polymethyleneimino containing from 2 to 7 methylene groups, e.g. ethyleneimino, propyleneimino, pyrrolidyl, piperidyl and hexamethyleneimino; or a saturated 5- to 6-membered heterocycle containing two ring hetero atoms of which one is a nitrogen atom bound directly to the carbon in the 6-position of one of the said formulae and the other is either an oxygen atom, a sulfur atom, imino nitrogen, lower alkylimino nitrogen or hydroxy(lower)alkylimino nitrogen, e.g. 4-methyl-piperazinyl, 4-ethylpiperazinyl and morpholino;

$R^3$ is either a hydrogen atom (—H); a halogen atom, e.g. —Cl, —Br, —I and —F; nitro (—$NO_2$); or trifluoromethyl (—$CF_3$); and Each of $R^4$ and $R^5$ is, independently, either a hydrogen atom (—H) or methoxy (—$OCH_3$); or, together, methylenedioxy (—O—$CH_2$—O—).

The key intermediates for the synthesis of compounds I are

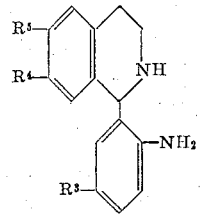

II wherein each of $R^3$, $R^4$ and $R^5$ has its above-ascribed meaning.

Intermediates II are prepared according to a number of different reaction schemes either from known starting materials or from starting materials which are readily prepared by the art-skilled according to known procedures and from known materials. Exemplary reaction schemes are:

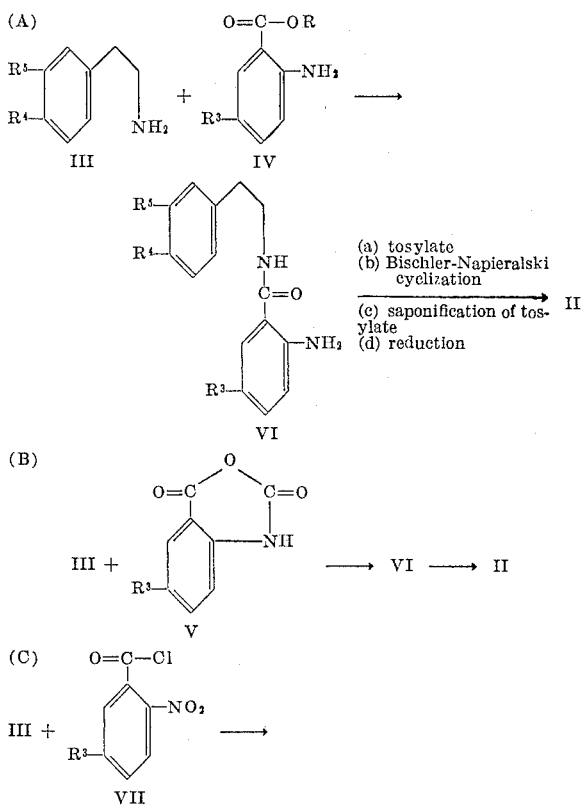

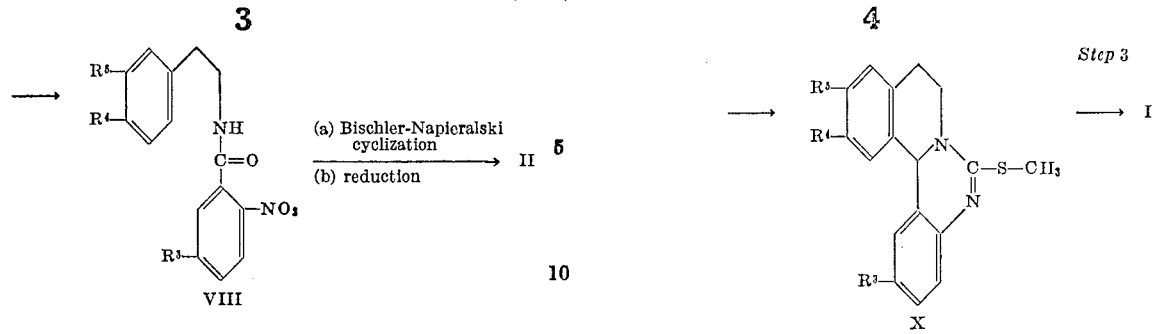

wherein R is either methyl or ethyl.

Reaction A comprises heating an admixture of equimolar amounts of compounds III and IV at temperatures up to from 150° to 200° C. (preferably in vacuo) or by refluxing the admixture in an inert organic solvent, such as dioxane, toluene or xylene, to obtain compound VI. Reaction B starts rapidly at room temperature (20° C.) on admixture of compounds III and V in an inert solvent, such as tetrahydrofurane, dioxane, dimethylformamide and dimethylsulfoxide with evolution of carbon dioxide; completion of the first step is effected by heating for fifteen minutes on a water bath; compound VI is thereafter precipitated on addition of dilute sodium hydroxide to the obtained solution.

The first step of reaction C is conducted in aqueous alkali, e.g. sodium hydroxide (Schotten-Baumann conditions), preferably in admixture with a water-miscible solvent, e.g. tetrahydrofurane and dioxane.

To protect the amino group of intermediate VI during the Bischler-Napieralski ring closure, the use of said intermediate in the form of its tosylate is satisfactory, but other protecting groups, such as benzene sulfonyl, brosyl and mesyl, are alternatively employed. The preparation of the tosylate is carried out in the usual well-known manner either under Schotten-Baumann conditions or in pyridine.

Ring-closure of the tosylate to the corresponding 3,4-dihydroisoquinoline compound (Bischler-Napieralski reaction) occurs on boiling in xylene with phosphorus pentoxide or refluxing in phosphorous oxychloride. Other known dehydrating agents and reaction conditions also bring about this reaction.

The protecting tosyl group is split off in essentially quantitative yield on standing for from 2 to 15 hours in concentrated sulfuric acid at room temperature.

Catalytic hydrogenation of the 3,4-dihydroisoquinolines in acetic acid (platinum catalyst) yields the 1,2,3,4-tetrahydroisoquinolines II. Either palladium or nickel hydrogenation catalysts are alternatively employed. Other reducing agents for 3,4-dihydroisoquinolines are, e.g., zinc/hydrochloric acid, tin/hydrochloric acid, iron/hydrochloric acid and sodium borohydride.

Compounds I are prepared from the corresponding 1-(2-aminophenyl)-1,2,3,4-tetrahydroisoquinolines II in three steps:

(D)

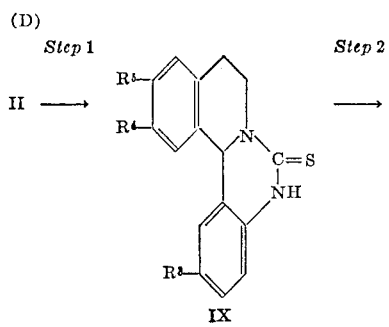

Step 3

Step 1 is effected by refluxing for several hours in pyridine a solution of the intermediate II in carbon disulfide ($CS_2$) to obtain a 5,6,8,9-tetrahydro-13bH-isoquinolo[2,1-c]quinazoline-6-thione IX. Step 2 is a reaction of IX with methyl iodide; this reaction takes place in either dimethylformamide (DMF) or dimethylsulfoxide (DMSO) at room temperature (20° C.) in 30 minutes to produce a 6-methylthio-8,9-dihydro-13bH-isoquinolo[2,1-c]quinazoline X. The third step comprises heating (either in an inert solvent or without any solvent) compound X from 2 to 40 hours at a temperature from 140° to 160° C. with an amine

or its acetate

whereby the 6-amino-8,9-dihydro-13bH-isoquinolo[2,1-c]quinazolines I of this invention are obtained.

The amines employed in Step 3 are extremely diverse in nature. In addition to ammonia illustrative amines are lower alkylamines, e.g. methylamine and isopropylamine; di(lower)alkylamines, e.g. dimethylamine and N-methyl-N-ethylamine; arylamines, e.g. aniline and α-naphthylamine; ar(lower)alkylamines, e.g. benzylamine and phenethylamine; diamines

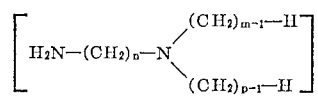

wherein $n$ is an integer from 2 to 6 and each of $m$ and $p$ is an integer from 2 to 5, e.g., dimehylaminoethylamine; cyclic amines, e.g. pyrrolidine and piperidine; cyclic diamines, e.g. 4-methylpiperazine, 4-(β-hydroxyethyl)-piperazine and N-ethylpyrazolidine; heterocyclic amines, e.g. 2-aminothiazole, 3-aminopyridine, 4-aminopyrimidine and 1-methyl-2-aminopiperidine; cyclic aminoethers, e.g. morpholine; amino(lower)alkanols, e.g. γ-hydroxypropylamine; piperidyl(lower)alkylamine, e.g. N-β-aminoethylpiperidine and N-methyl-2-(γ-aminopropyl)-piperidine; and pyridyl(lower)alkylamines, e.g. 3-(β-aminoethyl)-pyridine. The preceding amines are merely exemplary of those contemplated.

Compounds I and II have an asymmetric carbon atom and therefore exist either as optically active compounds or as racemates. Compounds II are resolved into the individual stereoisomers with an optically active acid, e.g. d-tartaric acid, according to well-known procedures. To prepare either of the optically active enantiomers of compounds I, the corresponding optically active compound II is employed as an intermediate.

Exemplary compounds I (defined by substituents $R^1$ to $R^5$) are presented in the following table:

The compounds of this invention are prepared according to the instantly-noted procedures from known start-

COMPOUNDS I

| $R^1$ | $R^2$ | $R^3$ | $R^4$ | $R^5$ | $N{<}^{R^1}_{R^2}$ |
|---|---|---|---|---|---|
| —H | —iPr | —Cl | —H | —MO | —Pi |
| —Me | —Bu | —Br | —H | —H | —HI |
| —Et | —H | —I | —MO | —MO | —Pa(pEt) |
| —Pr | —Me | —F | —MO | —H | —Mo |
| —iPr | —Et | —NO₂ | —O—CH₂—O— | | —IDi |
| —Bu | —Pr | —CF₃ | —H | —H | —TI |
| —Tr | —iPr | —H | —MO | —H | —Py |
| —Te | —Bu | —Cl | —H | —MO | —Py |
| —Pe | —H | —Br | —MO | —MO | —TI |
| —Hx | —Me | —H | —O—CH₂—O— | | —IDi |
| —Hp | —Et | —F | —H | —MO | —Mo |
| —Et(β-OH) | —H | —NO₂ | —H | —H | —Pa(pEt) |
| —Pr(γ-OH) | —H | —CF₃ | —MO | —MO | —HI |
| —Pr(β-OH) | —Me | —H | —MO | —H | —Pi |
| —Et(β-MO) | —H | —Cl | —O—CH₂—O— | | —Pa(pMe) |
| —Et(β-Mo) | —Me | —Br | —H | —B | —IDi |
| —Pr(γ-EO) | —Et | —H | —MO | —H | —Py |
| —Et(β-EA) | —H | —NO₂ | —H | —MO | —IDi |
| —Pr(γ-MA) | —Me | —CF₃ | —H | —H | —TI |
| —Et(β-Me₂A) | —H | —H | —MO | —MO | —Py |
| —Pr(γ-Et₂A) | —H | —Cl | —MO | —H | —Pi |
| —Be | —iPr | —Br | —O—CH₂—O— | | —HI |
| —Pe | —H | —I | —H | —H | —Pa(pEt) |
| —Et(Py) | —H | —F | —MO | —H | —Mo |
| —Pr(Pi) | —Me | —NO₂ | —H | —MO | —IDi |
| —Et | —H | —CF₃ | —MO | —MO | —TI |
| —Et(pMePa) | —H | —H | —O—CH₂—O— | | —Py | wherein (in addition to elemental symbols) the following are employed:

A—amino
Be—benzyl
Bu—butyl
EA—ethylamino
EO—ethoxy
Et—ethyl
Hp—cycloheptyl
HI—hexamethyleneimino
Hx—cyclohexyl
I—imino
IDi—ethyleneimino
iPr—isopropyl
MA—methylamino
Me—methyl
MO—methoxy
Mo—morpholino
p—para
Pa—piperazinyl
Pe—phenethyl
Pi—piperidyl
Pr—propyl
Pt—cyclopentyl
Py—pyrrolidyl
Te—cyclobutyl
TI—trimethyleneimino
Tr—cyclopropyl Each line of the table represents two compounds having in common the same $R^3$, $R^4$ and $R^5$; for one of the two compounds $R^1$ and $R^2$ are defined in the first two columns of the table; for the other, $N(R^1)R^2$ is defined in the final column of said table. When $N(R^1)R^2$ includes a piperazinyl group, one nitrogen atom of said group should be a secondary amino nitrogen. The nitrogen atom which is not bound to the basic ring structure of compound I may be substituted, e.g., by lower alkyl (e.g. methyl, ethyl, propyl, isopropyl and butyl) and hydroxy(lower)alkyl (e.g. β-hydroxyethyl, β-hydroxypropyl and γ-hydroxypropyl).

ing materials or from starting materials which are readily prepared by known procedures from available starting materials.

Compounds I are cardiovascular, e.g. hypotensive-antihypertensive, compounds and are useful as such. They are also useful as anti-inflammatories. In addition selected compounds are diuretics, analgesics, CNS depressants and CNS stimulants. Compounds I are administered either orally or parenterally. Daily doses vary from 5 milligrams to in excess of 100 milligrams, depending upon the particular compound.

Each of the pharmaceutically active compounds of this invention, may be, e.g., incorporated, for oral administration, in a tablet as the sole active ingredient. A typical tablet is constituted by from 1 to 3 percent binder, e.g. tragacanth; from 3 to 10 percent disintegrating agent, e.g. corn starch; from 2 to 10 percent lubricant, e.g. talcum; from 0.25 to 1.0 percent lubricant, e.g. magnesium stearate; an average dosage of active ingredient; and q.s. 100 percent filler, e.g. lactose; all percentages being by weight. Tablets are prepared according to standard tabletting techniques, which are well-known in the art, employing the necessary amounts of conventional granulating liquids, e.g. alcohol SD-30 and purified water. An exemplary tabletting formulation for the instant active compounds is:

| | Parts |
|---|---|
| Title compound of Example 7 | 35 |
| Tragacanth | 2 |
| Lactose | 54.5 |
| Corn starch | 5 |
| Talcum | 3 |
| Magnesium stearate | 0.5 |

Alcohol SD-30, q.s.
Purified water, q.s.

In the examples which follow, the parts and percentages are by weight unless otherwise specified, and the temperatures are in degrees centigrade. The relationship between parts by weight and parts by volume is the same as that between the kilogram and the liter.

Example 1.—5,6,8,9-tetrahydro-13bH-isoquinolo[2,1-c]quinazoline-6-thione

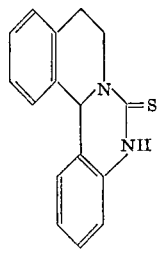

Reflux for 15 hours a solution of 10 parts of 1-(2-aminophenyl)-1,2,3,4-tetrahydroisoquinoline in 40 parts by volume of pyridine, 32 parts by volume of carbon disulfide and 2 parts by volume of water. Evaporate in vacuo the excess carbon disulfide from the thus-refluxed material. Dilute the resultant with water to precipitate the title compound, melting point (M.P.) 254° to 256°, in practically quantitative yield.

Example 2.—2-chloro-5,6,8,9-tetrahydro-13bH-[2,1-c]quinazoline-6-thione

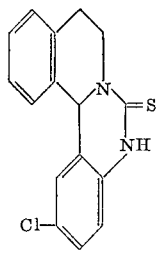

Reflux for 15 hours a solution of 100 parts of 1-(2-amino-5-chlorophenyl)-1,2,3,4-tetrahydro-isoquinoline in 400 parts by volume of pyridine, 300 parts by volume of carbon disulfonic (CS$_2$) and 20 parts by volume of water. Evaporate in vacuo the excess carbon disulfide from the thus-refluxed material. Dilute the resultant with water to precipitate the title compound, M.P. 236° to 238°.

Example 3.—11,12-dimethoxy-5,6,8,9-tetrahydro-13bH-isoquinolo[2,1-c]quinazoline-6-thione

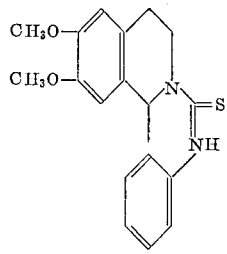

Reflux a solution of 5 parts of 1-(2-aminophenyl)-6,7-dimethoxy-1,2,3,4-tetrahydroisoquinoline in 20 parts by volume of pyridine, 13 parts by volume of carbon disulfide and two parts by volume of water. Evaporate in vacuo the excess carbon disulfide from the thus-refluxed material. Dilute the resultant with water to precipitate the title compound, M.P. 217° to 221°, in practically quantitative yield.

Example 4.—6-methylthio-8,9-dihydro-13bH-isoquinolo[2,1-c]quinazoline

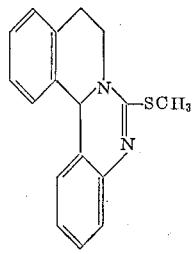

Suspend 50 parts of the title compound in Example 1 in 250 parts by volume of dimethylsulfoxide (DMSO). Add 50 parts of methyl iodide to the obtained suspension. Stir the resultant for one hour, thus obtaining a clear red solution. Add 30 parts by volume of 30 percent (aq.) sodium hydroxide to the clear red solution. Dilute the product with one liter of water to precipitate the title compound, M.P. 134° to 135°. Filter and dry the title compound. A 98% yield is thus obtained.

Example 5.—2-chloro-6-methylthio-8,9-dihydro-13bH-isoquinolo[2,1-c]quinazoline

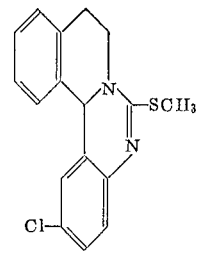

Suspend 100 parts of the title compound of Example 2 in 450 parts by volume of DMSO. Add 100 parts of methyl iodide to the obtained suspension. Stir the resultant for one hour at room temperature (20°), thus obtaining a clear solution. Add 60 parts by volume of 30 percent (aq.) sodium hydroxide to the clear solution. Dilute this solution with water to precipitate the title compound, M.P. 162° to 163°, in almost quantitative (94%) yield.

Example 6.—11,12-dimethoxy-6-methylthio-8,9-dihydro-13bH-isoquinolo[2,1-c]quinazoline

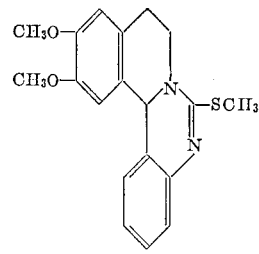

Following the procedure of Example 5 and replacing the title compound of Example 2 with an equivalent of the title compound of Example 3 results in the preparation, in similar manner, of the subject title compound.

Example 7.—6-dimethylaminopropylamino-8,9-dihydro-13bH-isoquinolo[2,1-c]quinazoline

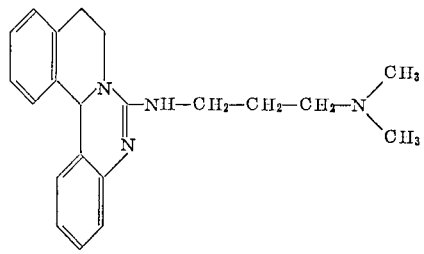

Reflux for 15 hours a mixture of 10 parts of the title compound of Example 4 and 10 parts of N,N-dimethylpropylenediamine. Dilute the obtained solution with water, and extract the resultant with diethylether.

Dry the organic phase over sodium sulfate, and thereafter evaporate said phase in vacuo to dryness. Crystallize the produced oily residue from diethylether/petroleum ether to obtain 8.5 parts (72% yield) of title compound, M.P. 106° to 107°.

*Example 8.—6-(N-methylpiperazino)-8,9-dihydro-13bH-isoquinolo[2,1-c]quinazoline*

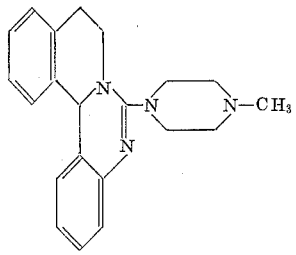

Reflux for 15 hours a mixture of 10 parts of the title compound of Example 4 and 10 parts of N-methylpiperazine. Dilute the obtained solution with water, and extract the resultant with methylene chloride.

Dry the organic phase over sodium sulfate, and thereafter evaporate said phase in vacuo to dryness. Crystallize the produced oily residue from acetone to obtain a 44% yield of the title compound, M.P. 194° to 197°.

*Example 9.—6-dimethylaminoethylamino-8,9-dihydro-13bH-isoquinolo[2,1-c]quinazoline hydrochloride*

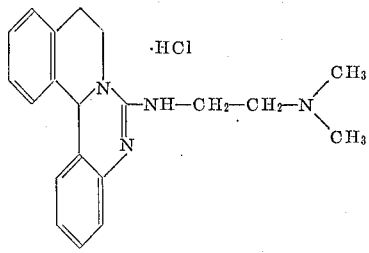

Reflux for 15 hours a mixture of 10 parts of the title compound of Example 4 and 10 parts of N,N-dimethylethylenediamine. Dilute the obtained solution with water, and extract the resultant with diethylether.

Dry the organic phase over sodium sulfate, and thereafter evaporate said phase in vacuo to dryness. Dissolve the produced oil residue in acetone. Precipitate the title compound, M.P. 210° to 218°, from the acetone solution by adding thereto 1 mole of methanolic hydrogen chloride. A 78% yield is thus obtained.

*Example 10.—6-benzylamino-8,9-dihydro-13bH-isoquinolo[2,1-c]quinazoline*

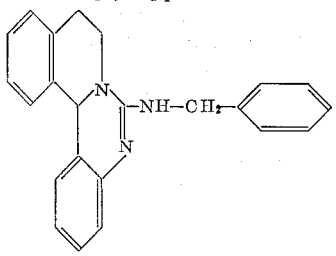

Maintain at 160° for 2.5 hours a mixture of 2 parts of the title compound of Example 4 and 2 parts of benzylamine. Cool the product to room temperature. Add diethylether to the cooled product to crystallize the title compound, M.P. 144° to 145°. An 80% yield is thus obtained.

*Example 11.—6-morpholino-8,9-dihydro-13bH-isoquinolo[2,1-c]quinazoline hydrochloride*

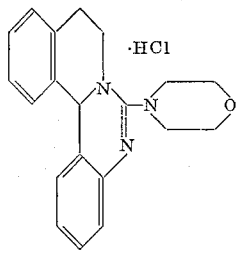

Reflux for 17 hours a mixture of 10 parts of the title compound of Example 4 and 10 parts of morpholine. Evaporate the product to obtain a yellow crystalline residue. Dissolve this residue in methylene chloride, and filter off the insoluble by-product.

Evaporate the filtrate to dryness. Dissolve the dried material in acetone. Add 1 mole of ethanolic hydrogen chloride to the acetone solution to crystallize out the title compound, M.P. in excess of 300°.

*Example 12.—6-amino-8,9-dihydro-13bH-isoquinolo[2,1-c]quinazoline*

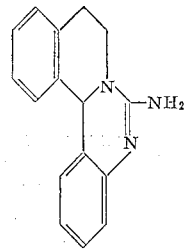

Fuse together 10 parts of the title compound of Example 4 and 10 parts of ammonium acetate at 140°, and maintain the melt at said temperature for 2 hours. Distribute the product between methylene chloride and dilute (aq.) sodium hydroxide. Dry the organic phase and evaporate same to obtain an amorphous residue. Crystallize said residue from methylene chloride/diethylether to obtain a 75% yield of the title compound, M.P. 220° to 221°.

*Example 13.—2-chloro-6-dimethylaminopropylamino-8,9-dihydro-13bH-isoquinolo[2,1-c]-quinazoline*

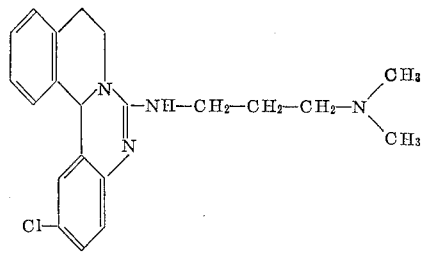

Reflux for 12 hours a solution of 10 parts of the title compound of Example 5 and 20 parts of dimethylaminopropylamine at 160°. Dilute the obtained solution with water and extract the resultant with diethylether.

Dry the organic phase over sodium sulfate, and thereafter evaporate said phase in vacuo to dryness. Crystallize the produced oily residue from diethylether/petroleum ether to obtain 3.1 parts (27% yield) of title compound, M.P. 117° to 118°.

*Example 14.—2-chloro-6-dimethylaminoethylamino-8,9-dihydro-13bH-isoquinolo[2,1-c]-quinazoline hydrochloride*

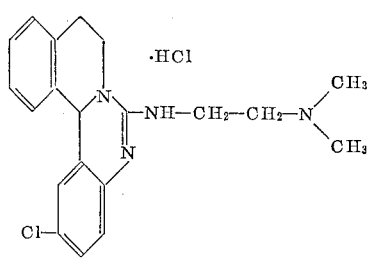

Reflux for 40 hours a mixture of 10 parts of the title compound of Example 5 and 20 parts of dimethylaminoethylamine at 160°. Dilute the obtained solution with water and extract the resultant with diethylether.

Dry the organic phase over sodium sulfate, and thereafter evaporate said phase in vacuo to dryness. Dissolve the produced oily residue in acetone. Precipitate the title compound, M.P. 235° to 238°, from the acetone solution by adding thereto 1 mole of methanolic hydrogen chloride. A 28% yield is thus obtained.

*Example 15.—2-chloro-6-(N-methylpiperazino)-8,9-dihydro-13bH-isoquinolo[2,1-c]quinazoline*

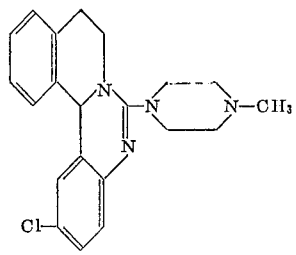

Reflux for 40 hours a mixture of 10 parts of the title compound of Example 5 and 20 parts of N-methylpiperazine. Dilute the obtained solution with water and extract the resultant with methylene chloride.

Dry the organic phase over sodium sulfate, and thereafter evaporate said phase in vacuo to dryness. Crystallize the produced oily residue from methanol to obtain a 41% yield of the title compound, M.P. 202° to 205°.

*Example 16.—6-methylamino-8,9-dihydro-13bH-isoquinolo[2,1-c]quinazoline*

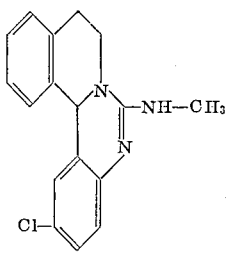

Fuse together 1 part of the title compound of Examples 4 and 2 parts of methylammonium acetate at 140°, and maintain the melt at said temperature for 2 hours. Distribute the product between methylene chloride and dilute (aq.) sodium hydroxide. Dry the organic phase, and evaporate same to obtain an amorphous residue. Crystallize said residue from ethyl acetate to obtain a yield of 81% of the title compound, M.P. 170° to 175°.

*Example 17.—2-chloro-6-amino-8,9-dihydro-13bH-isoquinolo[2,1-c]quinazoline*

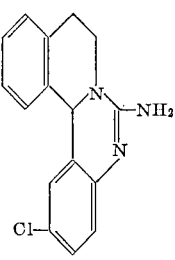

Fuse together five parts of the little compound of Example 5 and 10 parts of ammonium acetate at 150°, and maintain the melt at said temperature for 2 hours. Distribute the product between methylene chloride and dilute (aq.) sodium hydroxide. Dry the organic phase, and evaporate same to obtain an amorphous residue. Crystallize said residue from ethanol to obtain an 89% yield of the title compound, M.P. 228° to 230°.

*Example 18.—6-cyclohexylamino-8,9-dihydro-13bH-isoquinolo[2,1-c]quinazoline hydrochloride*

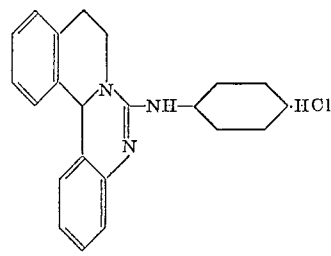

Fuse together 6 parts of the title compound of Example 4 and 10 parts of cyclohexylammonium acetate at 160° and maintain the melt at the same temperature for 2 hours. Distribute the product between diethylether and dilute (aq.) sodium hydroxide. Dry the organic phase and evaporate same to obtain an amorphous residue. Dissolve the dried material in acetone. Add 1 mole of ethanolic hydrogen chloride to the acetone solution and crystallize out the title compound, M.P. 175° to 177°. An 80% yield is thus obtained.

*Example 19.—6-(2-thiazolyl)-amino-8,9-dihydro-13bH-isoquinolo[2,1-c]quinazoline*

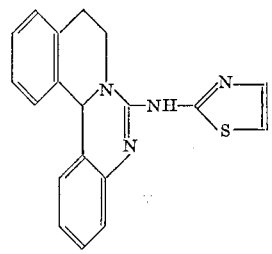

Fuse together 2 parts of the title compound of Example 4 and 9.6 parts of 2-thiazolylammonium acetate at 140° and maintain the melt at said temperature for 2 hours. Distribute the product between methylene chloride and dilute (aq.) sodium hydroxide. Dry the organic phase and evaporate same to obtain an amorphous residue. Crystallize said residue from ethyl acetate to obtain a 72% yield of the title compound, M.P. 170° to 171°.

*Example 20.—6-(β-hydroxyethyl)-amino-8,9-dihydro-13bH-isoquinolol[2,1-c]quinazoline*

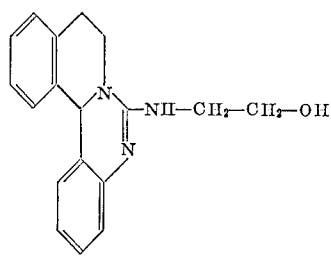

Fuse together 7 parts of the title compound of Example 4 and 8.5 parts of β-hydroxyethylammonium acetate, and maintain the melt at said temperature for 2 hours. Distribute the product between methylenechloride and water, add dilute (aq.) sodium hydroxide to the aqueous phase to reach a pH of 6.0; filter off the precipitated by-product, make filtrate strongly alkaline with sodium hydroxide to precipitate out the title compound which can be recrystallized from methanol, M.P. 196° to 199°.

Example 21.—6-isopropylamino-8,9-dihydro-13bH-isoquinolo[2,1-c]quinazoline

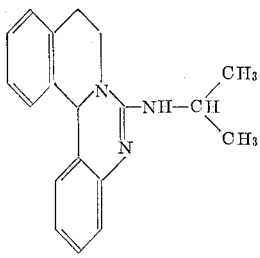

Fuse together 6 parts of the title compound of Example 4 and 12 parts of isopropylammonium acetate at 140°, and maintain the melt at said temperature for 6 hours. Distribute the product between methylene chloride and dilute (aq.) sodium hydroxide. Dry the organic phase and evaporate same to obtain an amorphous residue. Crystallize said residue from diethylether/petroleum ether to obtain a 60% yield of the title compound, M.P. 154° to 156°.

Example 22.—6-cyclopentylamino-8,9-dihydro-13bH-isoquinolo[2,1-c]quinazoline

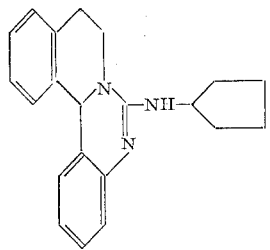

Fuse together 5 parts of the title compound of Example 4 and 8 parts of cyclopentylammonium acetate at 140°, and maintain the melt at said temperature for 2 hours. Distribute the product between methylene chloride and dilute (aq.) sodium hydroxide. Dry the organic phase and evaporate same to obtain an amorphous residue. Crystallize said residue from ethanol/petroleum ether to obtain a 77% yield of the title compound, M.P. 89° to 90°.

Example 23.—6-(γ-morpholino)-propylamino-8,9-dihydro-13bH-isoquinolo[2,1-c]quinazoline

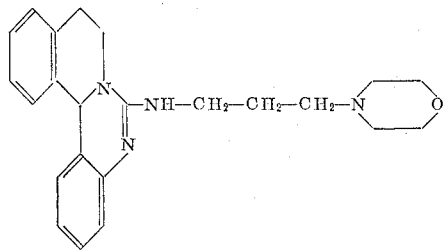

Fuse together 5 parts of the title compound of Example 4, 5 parts of N-γ-aminopropyl-morpholine and 4.2 parts of glacial acetic acid at 150°, and maintain the melt at said temperature for 2 hours. Distribute the product between methylene chloride and dilute (aq.) sodium hydroxide. Dry the organic phase, and evaporate same to obtain an amorphous residue. Crystallize said residue from ethyl acetate to obtain a 91% yield of the title compound, M.P. 199° to 200°.

Example 24.—6-cycloheptylamino-8,9-dihydro-13bH-isoquinolo[2,1-c]quinazoline hydrochloride

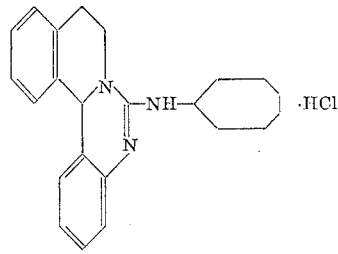

Fuse together 6 parts of the title compound of Example 4 and 12 parts of cycloheptylammonium acetate at 140°, and maintain the melt at said temperature for 8 hours. Dissolve the residue in ethanol and dilute with (aq.) hydrochloric acid and crystallize the title compound to obtain a 43% yield, M.P. 167° to 170°.

Example 25.—6-amino-11,12-dimethoxy-8,9-dihydro-13bH-isoquinolo[2,1-c]quinazoline acetic acid addition salts

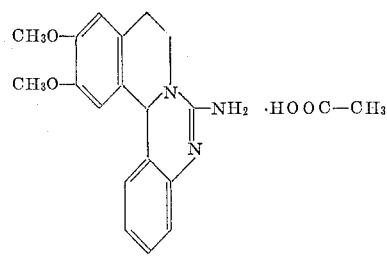

Fuse together 10 parts of the title compound of Example 6 and 25 parts of ammonium acetate at 160°, and maintain the melt at said temperature for 2 hours. Dissolve the product in 50 parts of water and crystallize said residue with 100 parts of water to obtain a yield of 71% of the title compound, M.P. 228° to 229°.

Example 26.—6-cyclohexylamino-11,12-dimethoxy-8,9-dihydro-13bH-isoquinolo[2,1-c]quinazoline

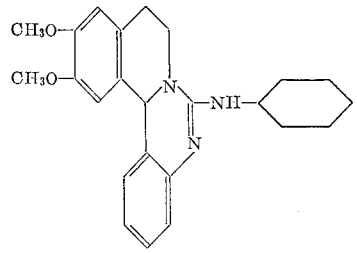

Fuse together 10 parts of the title compound of Example 6 and 20 parts of cyclohexylammonium acetate at 160°, and maintain the melt at said temperature for 2 hours. Distribute the product between methylene chloride and dilute (aq.) sodium hydroxide. Dry the organic phase and evaporate same to obtain an amorphous residue. Crystallize said residue from acetone/petroleum ether to obtain a 71% yield of the title compound, M.P. 114° to 117°.

Example 27.—6-(γ-dimethylaminopropyl)-amino-11,12-dimethoxy-8,9-dihydro-13bH-isoquinolo-[2,1-c]quinazoline

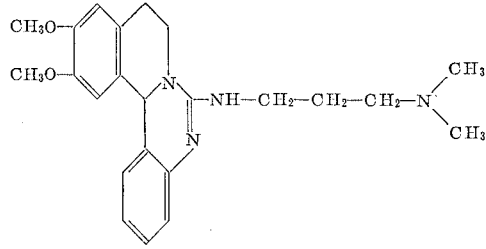

Fuse together 10 parts of the title compound of Example 6, 7 parts of N,N-dimethyl-1,3-diaminopropane and 8 parts of glacial acetic acid at 160°, and maintain the melt at said temperature for 1.5 hours. Distribute the product between methylene chloride and dilute (aq.) sodium hydroxide. Dry the organic phase and evaporate same to obtain an amorphous residue. Crystallize said residue from ethyl acetate/petroleum ether to obtain a 57% yield of the title compound, M.P. 126° to 128°.

*Example 28.—11,12-dimethoxy-6-morpholino-8,9-dihydro-13bH-isoquinolo[2,1-c]quinazoline*

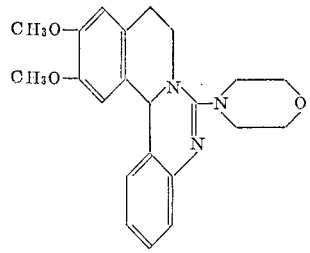

Fuse together 10 parts of the title compound of Example 6 and 20 parts of morpholinium acetate at 150°, and maintain the melt at said temperature for 2 hours. Dissolve the product in 50 parts of water. Allow to stand for thirty minutes. Filter off the precipitated by-product. Add sodium hydroxide to the filtrate and extract the alkaline solution with methylenechloride. Dry the organic phase over sodium sulfate and evaporate same to obtain an amorphous residue. Crystallize said residue from ether to obtain a 52% yield of the title compound, M.P. 209° to 211°.

*Example 29.—N(β-phenethyl)-2-nitro-5-chloro-benzamide*

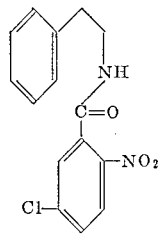

Add a solution of 6 parts of 2-nitro-5-chloro-benzoyl-chloride in 6 parts of dioxane at 35° to 50° dropwise under vigorous stirring and within 30 minutes to the mixture of 3 parts of β-phenethylamine and 1 part of sodium hydroxide in 15 parts of water and 5 parts of dioxane. Stir another 30 minutes. Add more water to crystallize out the product. Recrystallize from ethyl acetate/diethylether to obtain N-(β-phenethyl)-2-nitro-5-chloro-benzamide in white prisms, M.P. 102° to 104°.

*Example 30.—1-(2-nitro-5-chlorophenyl)-3,4-dihydroisoquinoline*

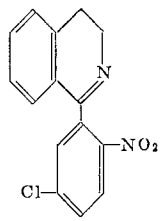

Add 2 parts of phosphorus pentoxide to the hot solution of 1 part of N-(β-phenethyl)-2-nitro-5-chloro-benzamide in 5 parts of xylene and reflux the mixture for 5 hours.

Thereafter evaporate the organic solvent in vacuo and then decompose the sticky residue with ice water. Extract the obtained water layer with diethylether to remove residual starting material. Then make the extracted water layer alkaline with concentrated sodium hydroxide.

Filter off the resulting crystalline title compound and recrystallize same from diethylether/pentane to obtain yellow prisms, M.P. 124° to 125°.

*Example 31.—1-(2-amino-5-chlorophenyl)-1,2,3,4-tetrahydroisoquinoline*

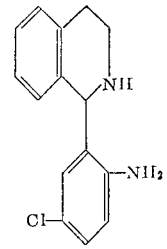

Catalytically hydrogenatae (0.02 parts of platinum catalyst) a solution of 1 part of 1-(2-nitro-5-chlorophenyl)-3,4-dihydroisoquinoline in 5 parts of acetic acid at room temperature and atmospheric pressure. After filtration and evaporation in vacuo crystallize the residue from ethylacetate/diethylether to obtain 1-(2-amino-5-chloro-phenyl) - 1,2,3,4 - tetrahydroisoquinoline as white crystals, M.P. 125° to 127°.

It is thought that the invention and its advantages will be understood from the foregoing description. It is apparent that various changes may be made in the structures of compounds (I) without departing from the spirit and scope of the invention or sacrificing its material advantages. The examples merely provide illustrative embodiments.

What is claimed is:

1. A compound of one of the formulae

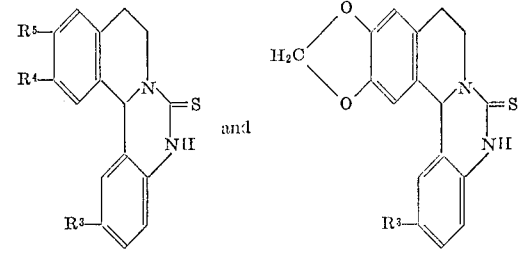

wherein
R³ is a member selected from the group consisting of a hydrogen atom, a halogen atom, nitro and trifluoromethyl; and
each of R⁴ and R⁵ is, independently, a member selected from the group consisting of a hydrogen atom and methoxy.

2. 5,6,8,9 - tetrahydro-13bH-isoquinolo[2,1-c]quinazoline-6-thione.

3. 2 - chloro - 5,6,8,9 - tetrahydro - 13bH - isoquinolo[2,1-c]quinazoline-6-thione.

4. 11,12 - dimethoxy - 5,6,8,9 - tetrahydro - 13bH-isoquinolo[2,1-c]quinazoline-6-thione.

5. A compound of one of the formulae

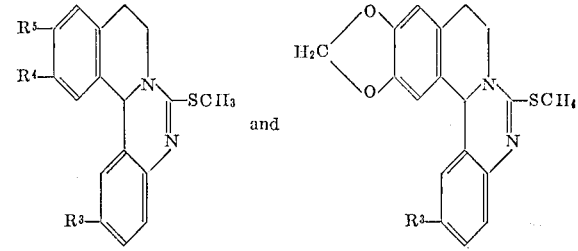

wherein
R³ is a member selected from the group consisting of a hydrogen atom, a halogen atom, nitro and trifluoromethyl; and each of R⁴ and R⁵ is, independently, a member selected from the group consisting of a hydrogen atom and methoxy.

6. 6-methylthio - 8,9-dihydro-13bH-isoquinolo[2,-1-c]quinazoline.

7. 2 - chloro - 6 - methylthio - 8,9-dihydro-13bH-isoquinolo[2,1-c]quinazoline.

8. 11,12 - dimethoxy - 6 - methylthio - 8,9 - dihydro-13bH-isoquinolo[2,1-c]quinazoline.

9. A pharmaceutically acceptable compound of one of the formulae

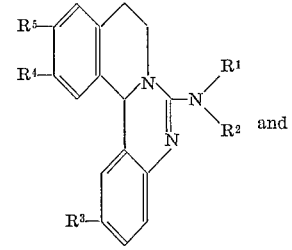 and 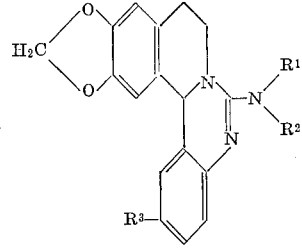

wherein
R¹ is a member selected from the group consisting of a hydrogen atom, lower alkyl, lower cycloalkyl, lower hydroxyalkyl, lower alkoxy lower alkyl, lower alkylamino lower alkyl having at least 2 carbon atoms in the alkylene bridge, lower dialkylamino lower alkyl, having a least 2 carbon atoms in the alkylene bridge, phenyl-(lower) alkyl, and —(CH₂)ₙ₋₁—Z;

Z is a heterocyclic radical containing from 5 to 6 ring members at least one of which is a nitrogen atom and at most one additional of which is a hetero atom selected from the group consisting of oxygen, nitrogen and sulfur, a ring member of the heterocyclic radical selected from the group consisting of a carbon atom and a nitrogen atom being bonded directly to the bridge —(CH₂)ₙ₋₁— when $n$ is one of the integers 3 and 4, and the nitrogen atom of —N(R¹)R² being bonded directly to an R¹ carbon atom selected from the group consisting of a carbon atom of said bridge and a ring carbon atom of said heterocyclic radical; and $n$ is a positive whole number of at most 4;

R² is a member selected from the group consisting of a hydrogen atom and lower alkyl;

R³ is a member selected from the group consisting of a hydrogen atom, a halogen atom, nitro and trifluoromethyl; and each of R⁴ and R⁵ is, independently, a member selected from the group consisting of a hydrogen atom and methoxy.

10. 6 - dimethylaminopropylamino - 8,9 - dihydro-13bH-isoquinolo[2,1-c]quinazoline.

11. 6 - dimethylaminoethylamino-8,9-dihydro-13bH-isoquinolo[2,1-c]quinazoline hydrochloride.

12. 6 - benzylamino-8,9-dihydro-13bH-isoquinolo[2,1-c]quinazoline.

13. 6 - amino-8,9-dihydro-13bH-isoquinolo[2,1-c]quinazoline.

14. 2 - chloro-6-dimethylaminoproylamino-8,9-dihydro-13bH-isoquinolo[2,1-c]quinazoline.

15. 2 - chloro-6-dimethylaminoethylamino-8,9-dihydro-13bH-isoquinolo[2,1-c]quinazoline hydrochloride.

16. 6 - methylamino-8,9-dihydro-13bH-isoquinolo[2,1-c]quinazoline.

17. 2 - chloro - 6-amino-8,9-dihydro-13bH-isoquinolo[2,1-c]quinazoline.

18. 6 - anilino - 8,9-dihydro-13bH-isoquinolo[2,1-c]quinolo[2,1-c]quinazoline.

19. 6 - (2 - thiazolyl) - amino-8,9-dihydro-13bH-isoquinolo[2,1-c]quinazoline.

20. 6 - (β - hydroxyethyl) - amino-8,9-dihydro-13bH-isoquinolo[2,1-c]quinazoline.

21. 6 - isopropylamino - 8,9-dihydro-13bH-isoquinolo[2,1-c]quinazoline.

22. 6 - cyclopentylamino-8,9-dihydro-13bH-isoquinolo[2,1-c]quinazoline.

23. 6 - (γ - morpholino) - propylamino - 8,9-dihydro-13bH-isoquinolo[2,1-c]quinazoline.

24. 6 - cycloheptylamino-8,9-dihydro-13bH-isoquinolo[2,1-c]quinazoline hydrochloride.

25. 6 - amino - 11,12-dimethoxy-8,9-dihydro-13bH-isoquinolo[2,1-c]quinazoline acetic acid addition salt.

26. 6 - (γ - dimethylaminopropyl) - amino - 11,12-dimethoxy-8,9-dihydro-13bH-isoquinolo[2,1-c]quinazoline.

27. A pharmaceutically acceptable compound of one of the formulae

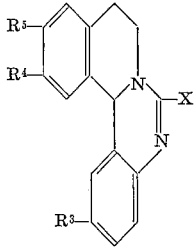 and 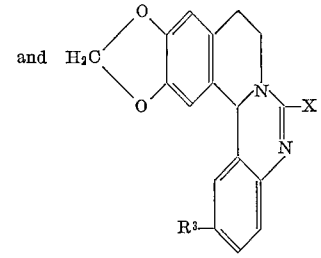

wherein
X is a member selected from the group consisting of polymethyleneimino containing from 2 to 7 methylene groups, and a saturated 5- to 6-membered heterocycle containing 2 ring hetero atoms of which one is a nitrogen atom bound directly to the carbon atom in the 6-position of one of the said formulae and the other is a member selected from the group consisting of an oxygen atom, a sulfur atom, imino nitrogen, lower alkylimino nitrogen and hydroxy(lower) alkylimino nitrogen;

R³ is a member selected from the group consisting of a hydrogen atom, a halogen atom, nitro and trifluoromethyl; and each of R⁴ and R⁵ is, independently, a member selected from the group consisting of a hydrogen atom and methoxy.

28. 6 - (N - methylpiperazino)-8,9-dihydro-13bH-isoquinolo[2,1-c]quinazoline.

29. 6 - morpholino - 8,9-dihydro-13bH-isoquinolo[2,1-c]quinazoline hydrochloride.

30. 2 - chloro - 6 - (N-methylpiperazino)-8,9-dihydro-13bH-isoquinolo[2,1-c]quinazoline.

31. 11,12 - dimethoxy-6-morpholino-8,9-dihydro-13bH-isoquinolo[2,1-c]quinazoline.

32. A pharmaceutically acceptable 6 - amino - 8,9-dihydro-13bH-isoquinolo[2,1-c]quinazoline acid addition salt.

No references cited.

ALEX MAZEL, *Primary Examiner.*

HENRY R. JILES, *Examiner.*

R. J. GALLAGHER, *Assistant Examiner.*